United States Patent
Harger et al.

(12)

(10) Patent No.: US 9,943,041 B2
(45) Date of Patent: Apr. 17, 2018

(54) PLANT TRELLIS BASE FOR A BUCKET

(71) Applicants: Mark A. Harger, Colorado Springs, CO (US); William A. Harger, Colorado Springs, CO (US)

(72) Inventors: Mark A. Harger, Colorado Springs, CO (US); William A. Harger, Colorado Springs, CO (US)

( * ) Notice: Subject to any disclaimer, the term of this patent is extended or adjusted under 35 U.S.C. 154(b) by 0 days.

(21) Appl. No.: 15/410,757

(22) Filed: Jan. 19, 2017

(65) Prior Publication Data
US 2017/0127621 A1  May 11, 2017

Related U.S. Application Data

(63) Continuation-in-part of application No. 14/058,597, filed on Oct. 21, 2013, now abandoned.

(51) Int. Cl.
*A01G 9/12* (2006.01)
*A01G 17/06* (2006.01)

(52) U.S. Cl.
CPC ............ *A01G 9/124* (2013.01); *A01G 17/06* (2013.01)

(58) Field of Classification Search
CPC . A01G 9/124; A01G 9/12; A01G 9/02; A01G 17/06; A01G 17/04
See application file for complete search history.

(56) References Cited

U.S. PATENT DOCUMENTS

| | | | | |
|---|---|---|---|---|
| 597,841 | A | * | 1/1898 | Dolf ............... A01G 9/12 47/47 |
| 601,691 | A | * | 4/1898 | Watson .......... A01G 13/0243 47/32.4 |
| 2,083,678 | A | * | 6/1937 | Wilson ............ A01G 9/12 403/186 |
| 2,695,474 | A | * | 11/1954 | Barstow .......... A01G 27/04 47/32 |
| 3,026,649 | A | * | 3/1962 | Barakauskas ...... A01G 9/12 47/47 |
| 3,264,783 | A | * | 8/1966 | Bayliss ............ A01G 9/12 108/190 |
| 4,074,461 | A | * | 2/1978 | Hirschman ....... A01G 9/124 248/165 |

(Continued)

FOREIGN PATENT DOCUMENTS

| | | | | |
|---|---|---|---|---|
| FR | 2668886 A1 | * | 5/1992 | ........... A01G 9/124 |
| FR | 2807288 A1 | * | 10/2001 | ........... A01G 9/12 |

(Continued)

*Primary Examiner* — Kathleen I Alker
(74) *Attorney, Agent, or Firm* — Jacob Ong; Ongs Law Firm, PLLC (57) ABSTRACT

In order to support a plant in a bucket that has a top and outside rim, a trellis base having a base surface portion and a rim engagement portion is disclosed. These portions seat on the top and outside rim of the bucket and extend around and beneath the top and outside rim of the bucket. A bottom portion of a further extension wall carries a hold down means which when positioned beneath the top and outside rim of the bucket, anchors the trellis base on the bucket. An inward bias means to inwardly bias and maintain the hold down means in position can also be used. The base surface portion carries at least one removable upright trellis holding means to removably carry the plant trellis.

20 Claims, 4 Drawing Sheets

(56) References Cited

U.S. PATENT DOCUMENTS

| | | | | |
|---|---|---|---|---|
| 4,841,670 A | * | 6/1989 | Bitter | A01G 7/045 47/47 |
| 8,826,588 B1 | * | 9/2014 | MacKichan | A01G 9/12 47/30 |
| 2012/0000123 A1 | * | 1/2012 | Donaldson | A01G 9/12 47/45 |
| 2013/0062478 A1 | * | 3/2013 | Kamon, II | A01G 9/124 248/129 |
| 2015/0144749 A1 | * | 5/2015 | Leyshon | F21V 1/06 248/97 |

FOREIGN PATENT DOCUMENTS

| | | | | |
|---|---|---|---|---|
| GB | 2254767 A | * | 10/1992 | |
| GB | 2274571 A | * | 8/1994 | A01G 9/124 |

* cited by examiner

PLANT TRELLIS BASE FOR A BUCKET

TECHNICAL FIELD

The present invention relates generally to the field of trellises used to support plants; and more particularly, to a plant trellis base which is adapted for use on a bucket which is maintained in an upright position thereon by attachment to a rim portion of the bucket.

BACKGROUND

There are many plant trellises available. Most all of these plant trellises are anchored by pushing a base of the trellis into the ground around a growing plant. The problem with all of these plant trellises is that the roots of the plant, growing in the ground, are disturbed when the base is pushed into the ground. If the trellis is sufficiently oversized when the trellis is initially installed, it is possible that not too many of the roots will be severed.

Most plants sold by nurseries are started, grown, and sold in a bucket. When a plant is grown in a bucket, the problem of root severance when a trellis is installed is more pronounced. The roots of the plant tend to grow to the interior sidewall of the bucket, and then along the sidewall when they cannot extend radially any further. When the plant is removed from the bucket, thick and dense roots comprise the peripheral sides of the root ball which were previously adjacent to the bucket sidewall. Installation of a plant trellis in the bucket would initially sever a substantial amount of plant roots, severely injuring the growing plant. Another problem is that movement of the upper above ground portion of the plant (for example, due to wind), growing in a conventional ground-anchored plant trellis, moves the anchors in the ground surrounding the plant, and moves the ground itself. The plant trellis moves in relation to the bucket. This also disturbs the plant. What is needed is a plant trellis adapted to be anchored to the bucket itself rather than to the ground. By having a broader base this trellis would be more stable. It would not move with respect to the bucket.

Within this specification a bucket is broadly defined to include any plant container including a five gallon plastic bucket, a ceramic pot, etc., having a top rim portion and a sidewall thereof. Within this specification a plant trellis is defined to include a rod, a tube, or any plant trellis having a lower portion which can be grasped and held by an upright trellis holding means.

OBJECTS OF THE INVENTION

It is an object of this invention to disclose a plant trellis adapted to be anchored to a bucket. It is an object of this invention to disclose a plant trellis which is particularly adapted to supporting a growing plant in a bucket. It is an object of this invention to disclose a more stable plant trellis, one which would not move the roots in the bucket. It is yet a further object of this invention to disclose a plant trellis base for a bucket which allows one to reposition a center of gravity of the growing plant over the bucket.

One aspect of this invention provides for a trellis base configured to removably carry a plant trellis, to support a growing plant in a bucket having a top rim which extends from a sidewall of the bucket, comprising: a base surface portion, configured to hold thereon a plurality of removable upright trellis holding means, the base surface portion running peripherally along the top and inside rim of the bucket; the base surface portion transitioning into a rim engagement portion which extends up along the interior edge of, horizontally out and on top of, and then down and around, the rim of the bucket; and wherein a bottom portion of said rim engagement portion extends into a hold down means which when positioned beneath the top and outside rim of the bucket, anchors the trellis base on the bucket; an inward bias means to inwardly bias and maintain the hold down means beneath the top and outside rim of the bucket. In one embodiment, there can be an opening in the base surface portion, the rim engagement portion, and the downwards extension, hold down means, etc. Once the trellis base is seated on the top rim of the bucket, and the hold down means is positioned and maintained by the inward bias means beneath the outwardly extending top and outside rim of the bucket, the opening can be squeezed together by a trellis base adjustable lock. In such a way, the trellis base is more solidly anchored to a wider base, with less possibility of disturbing the growing plant in the bucket, than if the trellis was anchored by penetrating ground inside the bucket.

In a preferred aspect of this invention the trellis base is molded from flexible and resilient plastic, and the hold down means comprises a generally linear further extension of the outer side rim beneath the top and outside rim of the bucket, and wherein a lower portion of the extension is adapted to be biased inwardly, and maintained beneath the top and outside rim of the bucket with an inward bias means which comprises with a trellis base adjustable lock to tighten the trellis base onto the bucket. In one embodiment, a self locking plastic (nylon) tie can be used as the trellis base adjustable lock, the tie having opposite ends which slide one within the other, said tie locking in a most tightened position.

A method of using the plant trellis base most broadly described above comprises the steps of: attaching the trellis base to the top rim portion of the bucket without any insertion into soil in the bucket so that any movement of the trellis will not disturb roots in the soil within the bucket, and so that the plant trellis is more rigidly anchored on a wider base than it would be if it was anchored within the soil within the bucket; using the upright trellis removable holding means to hold a lower portion of the upright plant trellis on the trellis base; and, arranging and attaching the plant growing in the bucket to the plant trellis.

A method of anchoring a trellis on a bucket using the trellis base, as more narrowly described above in the preferred aspect of the invention, comprises the steps of: seating the trellis base to the top rim portion of the bucket without any insertion into soil in the bucket so that any movement of the trellis will not disturb roots in the soil within the bucket, and so that the plant trellis is more rigidly anchored on a wider base than it would be if it was anchored within the soil within the bucket; tightening a trellis base adjustable lock around the further extension of the outer side rim, above the outwardly extending flange thereon, to thereby bias inwardly, and maintain the rim extension portion beneath the outwardly extending rim of the bucket; positioning the plant trellis in the upright plant trellis removable holding means on a base surface portion 22 to hold a lower portion of the upright plant trellis on the trellis base; and finally, arranging and attaching the growing plant in the bucket to the plant trellis.

Various other objects, advantages and features of this invention will become apparent to those skilled in the art from the following description in conjunction with the accompanying drawings.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DETAILED DESCRIPTION OF THE DRAWINGS

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures, methods and functions have not been shown or described in detail to avoid unnecessarily obscuring the description of the embodiments.

Figure 1:
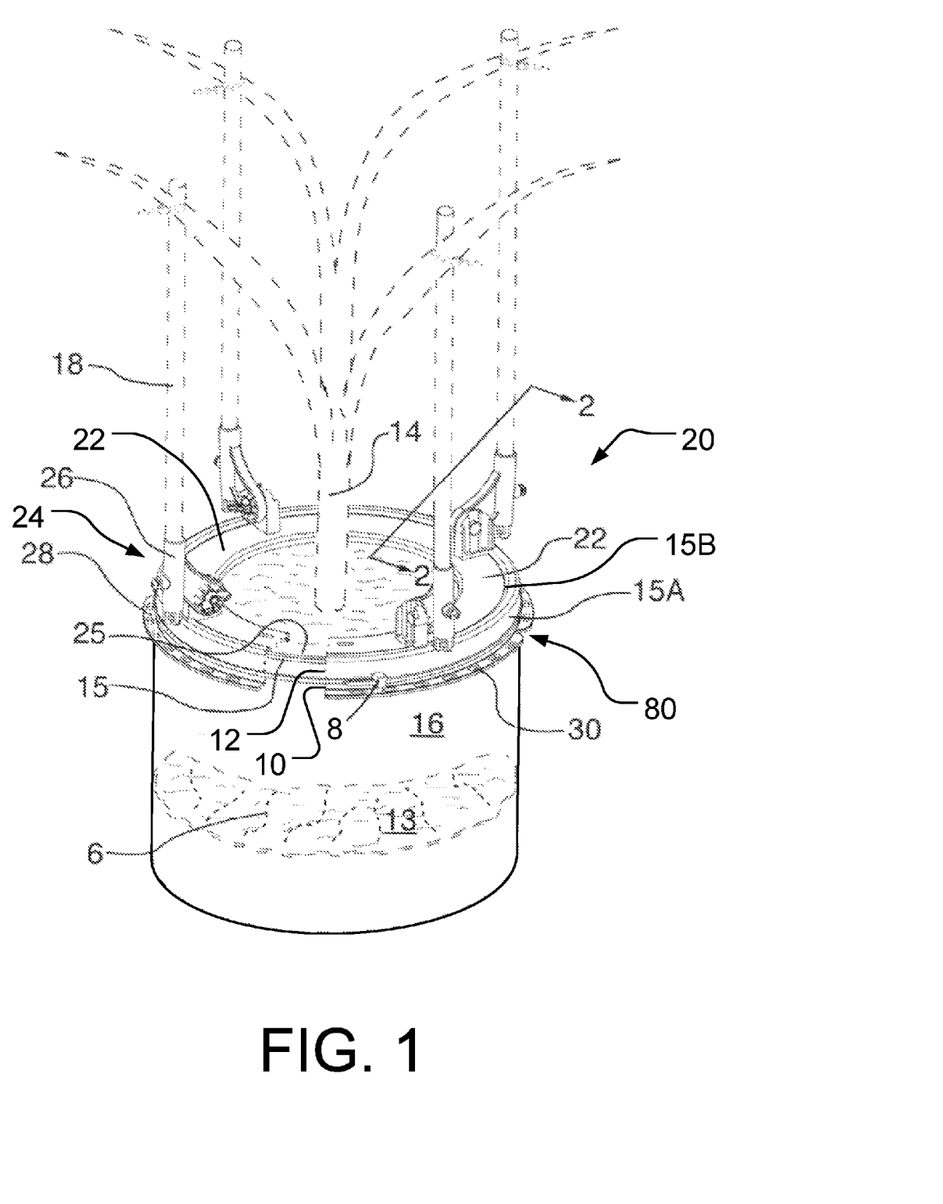
FIG. 1 is a perspective view of a plant trellis base for a bucket, carrying a plant trellis, mounted on a bucket having a growing plant therein.

Turning now to the drawings and more particularly to FIG. 1 we have a perspective view of a plant trellis base 20, carrying a plant trellis 18, mounted on a bucket 16 having a growing plant 14 therein. Most broadly, the trellis base 20 is configured to removably carry a plant trellis 18, to support a growing plant 14 in a bucket 16 having a top and outside rim 15 which may extend outwardly from a sidewall of the bucket 16, comprising: a base surface portion 22 extending from an interior diameter radially outward, the base surface portion 22 transitioning into a rim engagement portion 15A, 15B and 15C (see FIG. 2 for more details of these components); the rim engagement portion comprising a first inside wall portion 15B that extends upwards and wraps over into a top rim portion 15C, the top rim portion 15C extending generally horizontally outward before transitioning downwards into an outside wall portion 15A which is configured to curve below the top edge of the bucket's rim 15 and thereby securely hold the plant trellis base 20 onto the bucket. The rim engagement portion 15A, 15B and 15C seats on and runs peripherally along the top, inside and outside of the rim 15 of the bucket 16. A bottom portion of said outside wall portion 15A can carry a hold down means 12 which when positioned beneath the top and outside rim 15 of the bucket 16, anchors the trellis base 20 on the bucket 16. A further extension 15AA of outside wall portion 15A can extend downwards and inwards before transitioning into an inward bias means 10. An inward bias means 10 is inwardly biased and maintains the outside ring wall 15A beneath the top and outside rim 15 of the bucket 16 (see FIG. 2 for more details concerning these components).

The base surface portion 22 can carry a plurality of removable upright trellis holding means 24 to removably carry a plant trellis 18. In FIG. 1, the number of removable upright trellis holding means 24 is four, in other embodiments, the number can be greater than or less than four. As illustrated in the embodiment shown in FIG. 1, the trellis base 20 can encircle the top and rim of the bucket 16 but for an opening 25 between end portions (for an embodiment which does not utilize an opening 25, see FIG. 4). The gap allows the trellis base 20 to adjust for buckets having rims of varying perimeters. A trellis base adjustable lock 8 can be employed to tighten the end portions of the trellis base 20 together and thereby reduce the size of the opening 25 therebetween. The adjustable lock 8 illustrated in the embodiment shown in FIG. 1 comprises a plastic tie, in other embodiments, other types of tighteners/fasteners are contemplated such as a buckle, a classic ski-boot type buckle, a wire, an elastic cord, a rope, a large hose clamp, or even a set of screws that screw the trellis base 20 to the bucket 16.

After the trellis base is seated on the top and outside rim 15 of the bucket 16, and the hold down means 12 is positioned and maintained by the bias means 10 beneath the top and outside rim 15 of the bucket 16, the trellis base 20 is more solidly anchored to the bucket 16, without any possibility of disturbing the growing plant 14 in the bucket 16, than if the trellis 18 was anchored by penetrating ground 13 inside the bucket 16. The trellis base 20 has the further advantage of ensuring that the bottom portions of the trellis 18 do not pierce or otherwise damage the plant's roots 6 as said bottom portions are held above the soil and roots in the present invention.

Figure 3:
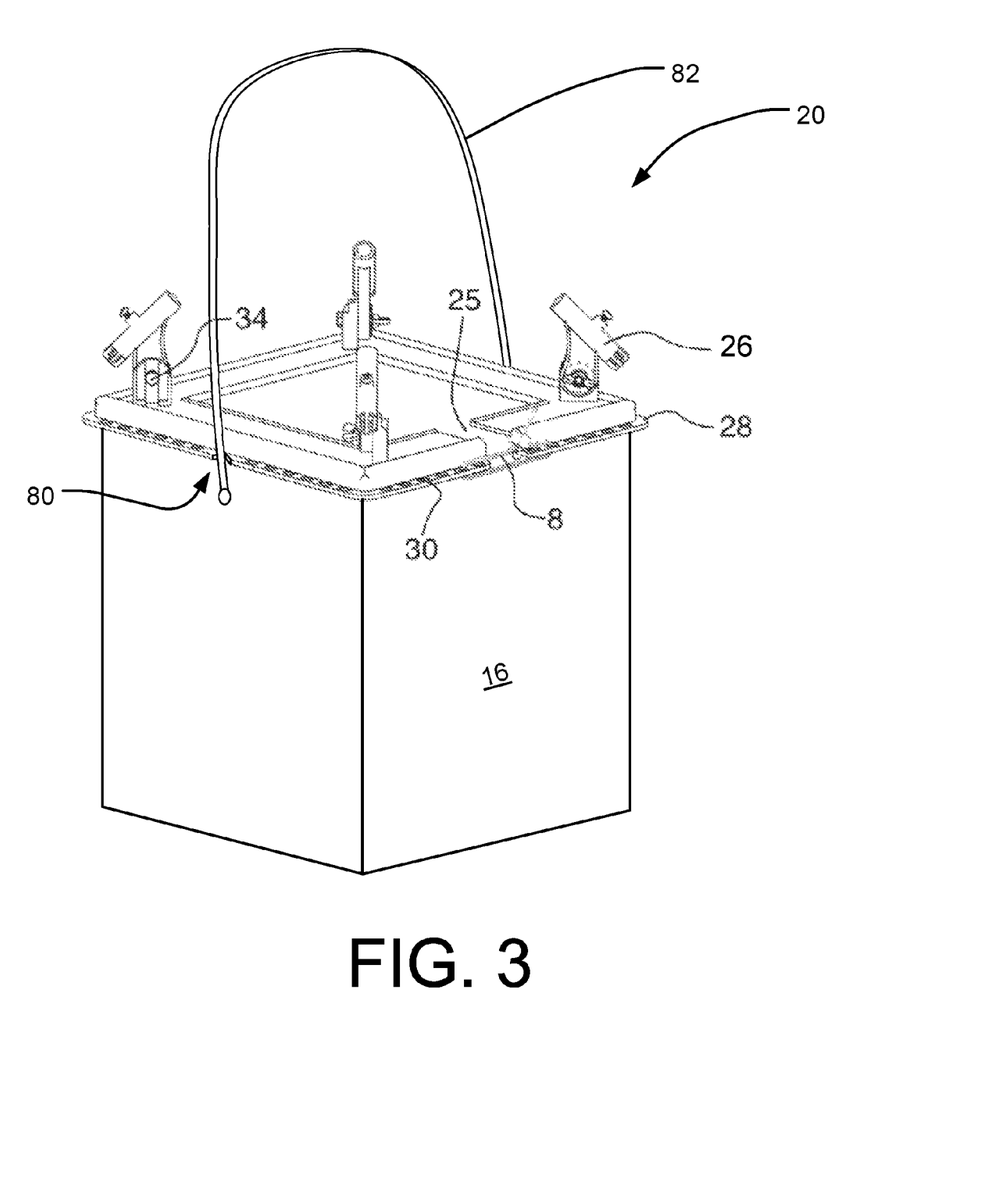
FIG. 3 is a perspective view of a trellis base adapted for a rectangular bucket.

A set of two handle notches 80 are incorporated into the trellis base 20 as illustrated in FIG. 1 (see item 80 and a corresponding, unlabeled notch on the opposite side, near reference number 24; see also FIG. 3). The handle notches 80 allow room for a bucket handle 82 (see FIG. 3) to function with the trellis base 20 installed on a bucket 16. If handle notches 80 were not incorporated, use of the handle 82 would tend to deform the trellis base 20 and could cause failure thereof or make the trellis base 20 otherwise unusable.

Figure 2:
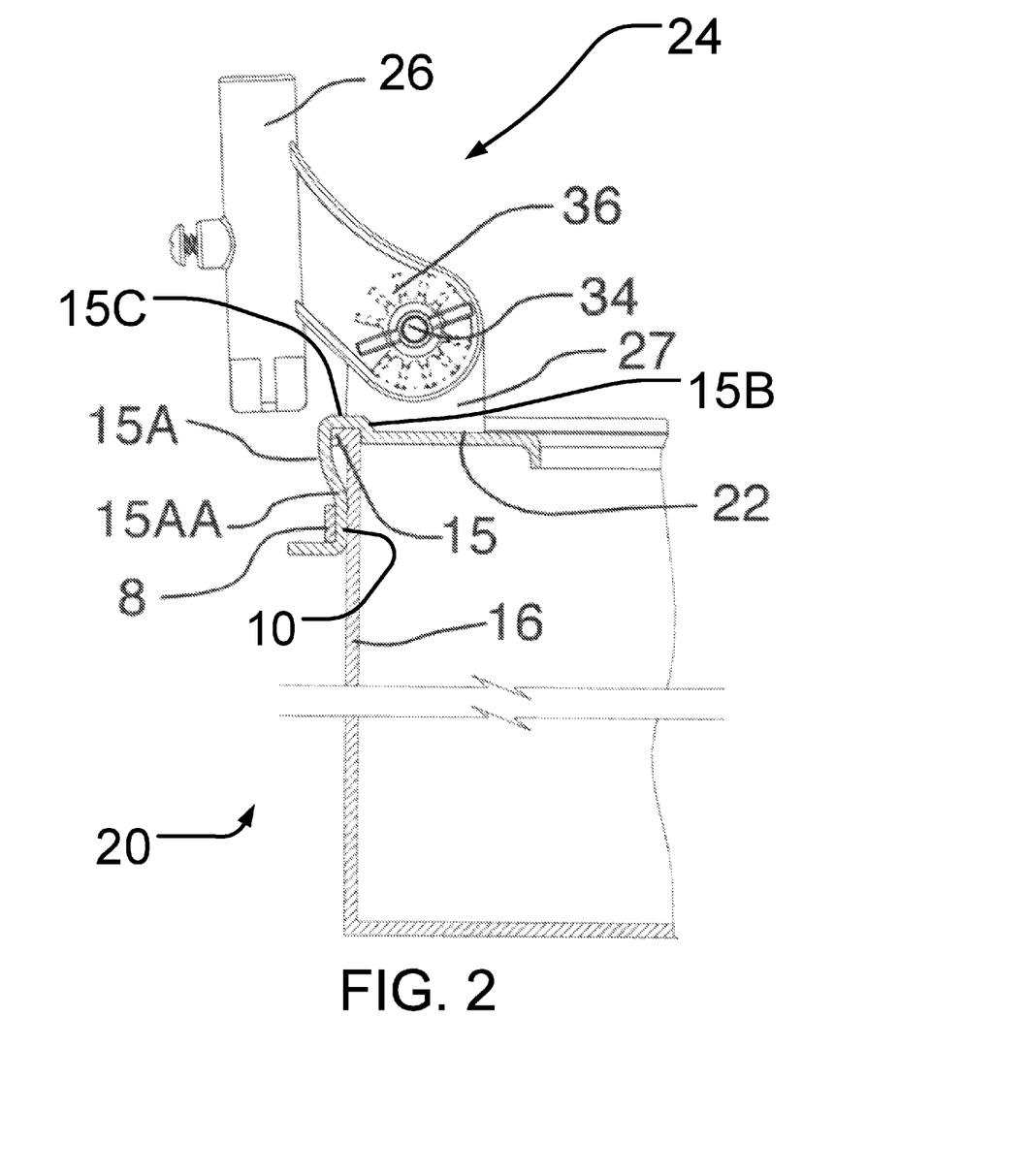
FIG. 2 is a partial cross sectional view as viewed along line 2-2 as shown in FIG. 1.

FIG. 2 is a cross sectional view as viewed along line 2-2 as shown in FIG. 1. In one embodiment, the trellis base 20 is molded from flexible and resilient plastic. In other embodiments, other types of material(s) can be utilized. The hold down means 12 most preferably comprises a generally linear further extension 15AA of the said outside wall portion 15A beneath the top and outside rim 15 of the bucket 16, and a lower portion of the further extension 15AA of the outside ring wall 15A, is adapted to be biased inwardly, and maintained beneath the top and outside rim 15 of the bucket 16 by the bias means 10, which can be held in place with a trellis base adjustable lock 8. In the most preferred embodiment of the invention the hold down means 12 further comprises an outwardly extending flange 28 (see also FIG. 1), positioned on the further extension 15AA of the ring wall 15A (or on the bias means 10), beneath the top and outside rim 15 of the bucket 16, to thereby prevent a trellis base adjustable lock 8 which encircles the bucket 16 from sliding downwardly off the further extension 15AA of the outside wall portion, or off of the bias means 10.

It is noted that the inventors initially considered an inwardly extending lip, (not shown) positioned beneath the outwardly extending top rim of the bucket. This was replaced by the claimed further extension, which is much easier to remove from a mould used in casting. In the most preferred embodiment of the invention the outwardly extending flange 28 further comprises spaced slots 30 therearound to facilitate attachment of the plant 14 to the trellis base 20; or alternatively, to position a trellis base adjustable lock 8 therein, to pull unattached end portions of the trellis base 20 together, to thereby bias and maintain the further extension 15AA inwardly, beneath the top and outside rim 15 of the bucket 16.

FIG. 3 is a perspective view of a trellis base 20 adapted for a rectangular bucket 16. In a preferred embodiment of the invention, the trellis removable holding means 24 comprises a tube portion 26 having a generally closed lower end portion dimensioned to receive a generally cylindrical lower end portion of the plant trellis 18. In other embodiments, the tube portion 26 can be rectangular, round, oval, etc. to match whatever shape(s) are commonly used in the base(s) of a trellis. In a preferred embodiment of the invention, the trellis removable holding means 24 is pivotably attached to the surface portion 22 so that the generally cylindrical lower end portion of the trellis 18 can rotate inwardly and outwardly in a radial plane to the bucket 16. Most preferably the pivot comprises a central tightening and attachment pivot screw 34 pivotably holding the rotatable tube portion 26 to a fixed portion 27, and wherein there are radial splines 36 between the portions 26, 27 attached by the pivot screw 34.

Most preferably the trellis base is adapted to seat on a generally round five gallon type bucket 16. Alternatively, the trellis base is adapted to seat on a generally rectangular bucket 16 (as shown in FIG. 3).

A method of anchoring a trellis 18 on a bucket 16 using the trellis base 20, as most broadly described above, comprises the steps of: attaching the trellis base 20 to the top and outside rim 15 of the bucket 16 without any insertion into soil 13 in the bucket 16 so that any movement of the trellis 18 will not disturb the soil 13 or roots 6 in the soil 13 within the bucket 16, and so that the plant trellis 18 is more rigidly anchored on a wider base than it would be if it was anchored within the soil 13 within the bucket 16; using a plurality of upright trellis removable holding means 24 on a base surface portion 22 to hold a lower portion of the upright plant trellis 18 on the trellis base 20; and, arranging and attaching the growing plant 14 in the bucket 16 to the plant trellis 18.

A method of anchoring a trellis 18 on a bucket 16 using the trellis base 20 as more narrowly described above comprises the steps of: seating the trellis base 20 on the top and outside rim 15 of the bucket 16 without any insertion into soil 13 in the bucket 16 so that any movement of the trellis 18 will not disturb roots 6 in the soil 13 within the bucket 16, and so that the plant trellis 18 is more rigidly anchored on a wider base than it would be if it was anchored within the soil 13 within the bucket 16; tightening a trellis base adjustable lock 8 positioned near the further extension 15AA of the outside wall portion 15A, above the outwardly extending flange 28 thereon, to thereby bias inwardly, and maintain the further extension 15AA beneath the top and outside rim 15 of the bucket 16; positioning the plant trellis 18 in the upright pant trellis removable holding means 24, on a base surface portion 22, to hold a lower portion of the upright plant trellis 18 on the trellis base 20; and finally, arranging and attaching the growing plant 14 in the bucket 16 to the plant trellis 18.

Figure 4:
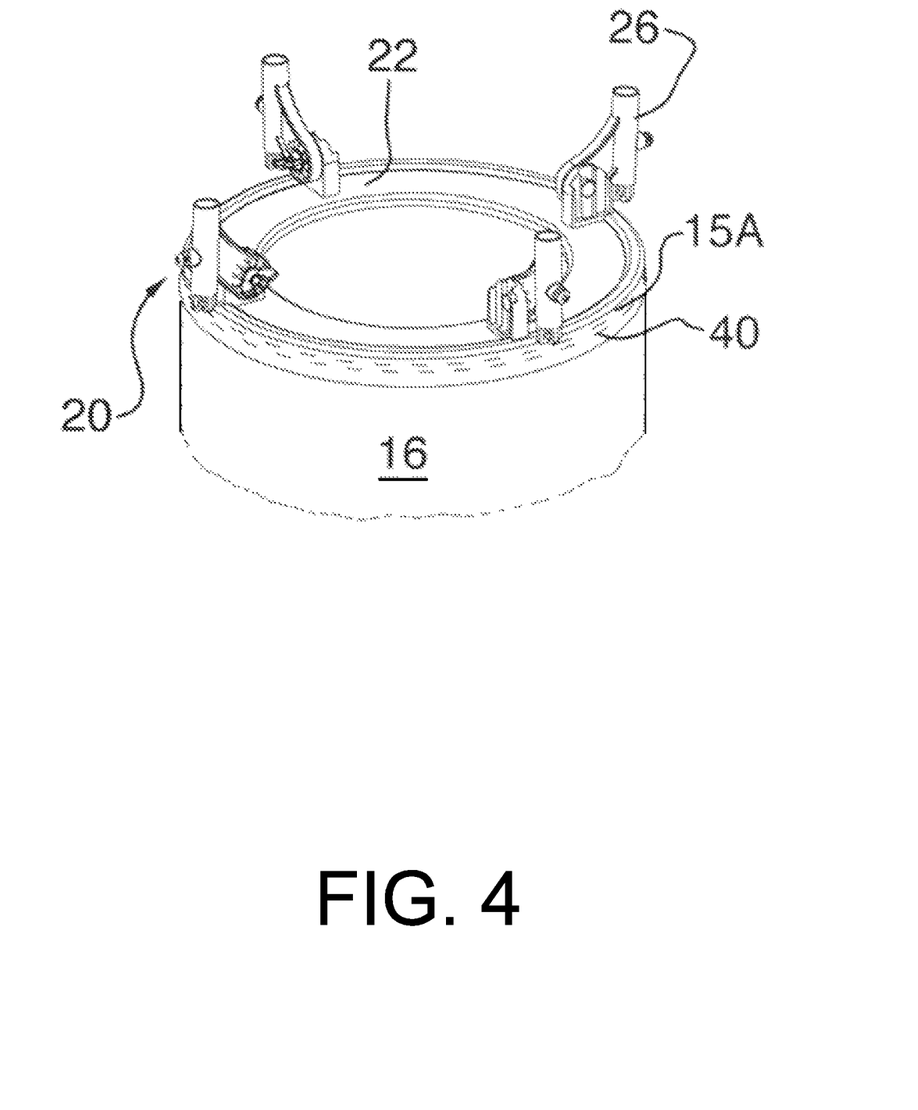
FIG. 4 is a perspective view of an alternative embodiment of the trellis base wherein the plant trellis base fully encircles and seats on the top and outside rim portion of the bucket and no trellis base adjustable lock is necessary to keep the trellis base firmly seated on the bucket.

FIG. 4 is a perspective view of an alternative embodiment of the trellis base 20 wherein the rim engagement portion 15A, 15B and 15C fully encircles the top rim portion 15 of the bucket 16 and the base surface portion 22 is continuous without an opening. In this alternative embodiment of the invention the trellis base 20 is again configured to removably carry a plant trellis 18, to support a growing plant 14 in a bucket 16 having a top and outside rim 15 which extends outwardly from a sidewall of the bucket 16. The trellis base 20 comprises: a base surface portion 22 configured to run peripherally along the top and inside of the rim 15 of the bucket 16; a rim engagement portion comprising an outside wall portion 15A which extends down, beneath the top and outside rim 15 of the bucket 16, an inside wall portion 15B which extends up, along the interior perimeter of the bucket rim 15, and a top rim portion 15C which connects 15A and 15B and which covers the top of the rim; and wherein a bottom further extension 15AA of the rim engagement portion 15A, 15B and 15C carries a hold down means 12 which when positioned beneath the top and outside rim 15 of the bucket 16, anchors the trellis base 20 on the bucket 16; an inward bias means 10 to inwardly bias and maintain the hold down means 12 beneath the top and outside rim 15 of the bucket 16; and wherein the base surface portion 22 carries one or more removable upright trellis holding means 24 to removably carry the plant trellis 18. After the base surface portion 22 and rim engagement portion 15A, 15B, and 15C are seated on the top and rim 15 of the bucket 16, and the hold down means 12 is positioned and maintained by the bias means 10 beneath the outwardly extending top and outside rim 15 of the bucket 16, the trellis base 20 is more solidly anchored to a wider base, with less possibility of disturbing the growing plant 14 in the bucket 16, than if the trellis 18 was anchored by penetrating ground 13 inside the bucket 16.

In a preferred embodiment the trellis base 20, immediately described above, is molded from flexible and resilient plastic, and the hold down means 12 comprises an interior lip 40, projecting from the ring wall 15A, positioned immediately beneath the top and outside rim 15 of the bucket 16, biased inwardly by the resilience of the plastic, to thereby maintain the trellis base 20 on the bucket 16.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, as well as those listed above, are incorporated herein by reference in their entirety. Aspects of embodiments can be modified, if necessary, to employ the systems, functions, and concepts of the various references to provide yet further embodiments.

In light of the above "Detailed Description," the inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventors. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventors contemplate the various aspects in any number of claim forms. Accordingly, the inventors reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

What is claimed is:

1. A trellis base configured to removably carry a plant trellis, the trellis base to configured for supporting a growing plant, the trellis base comprising:
    a base surface portion configured to run solely peripherally along an inside of a rim of a bucket, the base surface portion having a substantially horizontal upper surface that extends continuously along and between an inner perimeter of the base surface portion and an outer perimeter of the base surface portion;
    the outer perimeter of the base surface portion being coupled to a rim engagement portion;
    the rim engagement portion comprising a first inside wall portion extending upwards from the base surface portion and transitioning into a top rim portion, the top rim portion extending substantially horizontally away from the inner perimeter, wherein an outer edge of the top rim portion transitions into a downward-facing outside wall portion adapted to extend below a top edge of the rim of the bucket when the trellis base is seated on the top edge of the rim;
    the outside wall portion comprising an inward bias member and a further extension portion which carries a hold down means configured for anchoring the trellis base to the bucket when the hold down means is positioned beneath the rim of the bucket;
    the further extension portion extending downwards and inwards before transitioning into the inward bias member, the inward bias member configured to inwardly bias and maintain the hold down means beneath the top and outside rim of the bucket when the trellis base is seated to the bucket;
    the upper surface carrying at least one removable upright trellis holding means configured to removably couple with a plant trellis, the at least one removable upright trellis holding means being pivotably attached to the base surface portion.

2. A trellis base as in claim 1 wherein the trellis base has an incomplete-ring shape and is molded from flexible and resilient plastic, wherein the trellis base further comprises a trellis base adjustable lock selected from a group consisting of a self-locking plastic tie, a self-locking plastic nylon tie, a fastener, a buckle, a classic ski-boot type buckle, a wire, an elastic cord, a rope, a large hose clamp, and a set of screws, wherein the trellis base adjustable lock is positioned and configured to pull unattached end portions of the trellis base together.

3. A trellis base as in claim 2 wherein the hold down means further comprises a flange extending from the further extension portion, configured to be positioned beneath an outwardly extending rim portion of a bucket to thereby prevent the trellis base adjustable lock from sliding downwardly off the further extension portion.

4. A trellis base as in claim 3 wherein the at least one removable upright trellis comprises a first removable upright trellis holding means, a second removable upright trellis holding means, a third removable upright trellis holding means, and a fourth removable upright trellis holdings means;
    wherein each of the first, second, third, and fourth removable upright trellis holding means comprises a tube portion having a generally closed lower end portion dimensioned to receive a generally cylindrical lower end portion of the plant trellis.

5. A trellis base as in claim 4 wherein the at least one removable upright trellis holding means comprises a tube portion having a generally closed lower end portion dimensioned to receive a generally cylindrical lower end portion of the plant trellis.

6. A trellis base as in claim 5 wherein the tube portion of the at least one removable trellis holding means is pivotably attached to the base surface portion so that the generally cylindrical lower end portion of the trellis can rotate inwardly and outwardly in a radial plane, the radial plane being relative to a bucket when the trellis base is seated on the bucket.

7. A trellis base as in claim 6 wherein a pivot comprises a central tightening and attachment pivot screw pivotably holding the rotatable tube portion to a fixed portion, and wherein there are radial splines between the rotatable tube portion and the fixed portion attached by the pivot screw.

8. A trellis base as in claim 1 wherein the trellis base is configured to be seated on a generally round five gallon bucket.

9. A trellis base as in claim 1 wherein the trellis base is configured to be seated on a bucket selected from the group consisting of a generally round three gallon bucket and a generally round seven gallon bucket.

10. A trellis base as in claim 1 wherein the trellis base is configured to be seated on a generally rectangular bucket.

11. A trellis base as in claim 10 wherein the trellis base is molded from flexible and resilient plastic.

12. A trellis base as in claim 11 wherein the hold down means further comprises an outwardly extending flange extending from the further extension portion, configured to be positioned beneath an outwardly extending rim portion of a bucket, to thereby prevent a trellis base adjustable lock from sliding downwardly off of the further extension portion.

13. A trellis base as in claim 12 wherein the outwardly extending flange further comprises spaced slots spaced therearound to facilitate attachment of the growing plant thereto.

14. A trellis base as in claim 12 wherein the outwardly extending flange further comprises spaced slots spaced therearound to facilitate attachment of the trellis base adjustable lock thereto.

15. A trellis base as in claim 12 wherein the outwardly extending flange further comprises a first handle notch and a second handle notch, wherein the first handle notch is configured to receive a portion of a rotatable bucket handle and wherein the second handle notch is configured to receive a portion of the rotatable bucket handle.

16. A trellis base as in claim 11 wherein the at least one removable upright trellis holding means comprises a tube portion having a generally closed lower end portion dimensioned to receive a generally cylindrical lower end portion of the plant trellis.

17. A trellis base as in claim 16 wherein the tube portion of the at least one removable upright trellis holding means is pivotably attached to the base surface portion so that the generally cylindrical lower end portion of the trellis can rotate inwardly and outwardly in a radial plane, wherein the radial plane is relative to the bucket.

18. A trellis base as in claim 17 wherein a pivot comprises a central tightening and attachment pivot screw pivotably holding the rotatable tube portion to a fixed portion, and wherein there are radial splines between the rotatable tube portion and the fixed portion attached by the pivot screw.

19. A trellis base as in claim 11 wherein the trellis base is configured to be seated on a bucket selected from the group consisting of a generally round five gallon bucket, a generally round three gallon bucket, and a generally round seven gallon bucket.

20. A trellis base as in claim 11 wherein the trellis base is configured to be seated on a generally rectangular bucket.

* * * * *